(12) United States Patent
Culter et al.

(10) Patent No.: US 7,146,488 B2
(45) Date of Patent: Dec. 5, 2006

(54) SYSTEM AND METHOD FOR EXPANDING PROCESSOR FUNCTIONALITY

(75) Inventors: Bradley G. Culter, Dallas, TX (US); John A. Morrison, Fort Collins, CO (US); Martin O. Nicholes, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 10/414,701

(22) Filed: Apr. 16, 2003

(65) Prior Publication Data

US 2005/0005067 A1    Jan. 6, 2005

(51) Int. Cl.
*G06F 9/22*    (2006.01)

(52) U.S. Cl. ............................. 712/32; 711/118; 717/168

(58) Field of Classification Search .................. 713/2; 717/168; 719/321
See application file for complete search history.

(56) References Cited

U.S. PATENT DOCUMENTS

| | | | | |
|---|---|---|---|---|
| 4,193,113 A | * | 3/1980 | Cykowski | 710/267 |
| 5,481,713 A | * | 1/1996 | Wetmore et al. | 717/170 |
| 5,687,376 A | * | 11/1997 | Celi et al. | 717/127 |
| 5,809,303 A | * | 9/1998 | Senator | 719/325 |
| 5,829,012 A | * | 10/1998 | Marlan et al. | 711/102 |
| 6,128,731 A | * | 10/2000 | Zarrin et al. | 713/1 |
| 6,401,201 B1 | * | 6/2002 | Fish et al. | 713/2 |
| 6,470,408 B1 | | 10/2002 | Morrison et al. | 710/268 |
| 6,892,383 B1 | * | 5/2005 | Arndt | 718/1 |

OTHER PUBLICATIONS

INTEL Itanium Architecture Software Developer's Manual, vol. 2: System Architecture, Section 11.1 Firmware Model, Oct. 2002, Cover Page and pp. 2:249 through 2:258.

* cited by examiner

*Primary Examiner*—Kenneth S. Kim

(57) ABSTRACT

A system comprises at least one processor, and supporting firmware for supporting at least one function of the at least one processor. The system further comprises logic operable to expand the functionality of the at least one function in a fashion that is not natively supported by the supporting firmware, and an interposer for supporting the expanded functionality of the at least one function. A method for expanding the functionality of an execution unit of a system comprises implementing an execution unit in a system, and implementing pre-existing support firmware for the execution unit in the system, wherein the pre-existing support firmware supports at least one function of the execution unit. The method further comprises implementing logic expanding the at least one function in a manner not supported by the pre-existing support firmware, and implementing an interposer to support the expansion of the at least one function.

38 Claims, 6 Drawing Sheets

SYSTEM AND METHOD FOR EXPANDING PROCESSOR FUNCTIONALITY

BACKGROUND

The complexity, capacity, and intelligence of computer systems is ever evolving. Industry standards are often developed in attempt to provide a degree of compatibility between computer systems and/or their functional components. For instance, various processor architectures are known in the art, such as the PA-RISC family of processors developed by HEWLETT-PACKARD Company ("HP"), INTEL Corporation's (INTEL) architecture (IA) processors (e.g., the well-known IA-32 and IA-64 processors), and the like. As is well-known, IA-64 is a 64-bit processor architecture co-developed by HP and INTEL, which is based on Explicitly Parallel Instruction Computing (EPIC). ITANIUM is the first microprocessor based on the IA-64 architecture. Developed under the code name of MERCED, ITANIUM and its underlying architecture provide a foundation for software for various platforms, including without limitation the server and high-end workstation platforms.

In addition to supporting a 64-bit processor bus and a set of 28 registers, the 64-bit design of ITANIUM allows access to a very large memory (VLM) and exploits features in EPIC. Features of ITANIUM provide advances in the parallel processing handling of computer instructions known as predication and speculation. An additional ITANIUM feature includes a Level 3 (L3) cache memory, to supplement the current L1 and L2 cache memories found in most of today's microcomputers. Additional IA-64 microprocessors have followed ITANIUM, including those having the code names of MCKINLEY and MADISON.

Processor architecture generally comprises corresponding supporting firmware. For example, the IA-64 processor architecture comprises such supporting firmware as Processor Abstraction Layer (PAL), System Abstraction Layer (SAL), and Extended Firmware Interface (EFI). Such supporting firmware may enable, for example, the Operating System (OS) to access a particular function implemented for the processor. For instance, the OS may query the PAL as to the size of the cache implemented for the processor, etc. Other well-known functions provided by the supporting firmware (SAL, EFI) include, for example: (a) performing input/output ("I/O") configuration accesses to discover and program the I/O Hardware (SAL_PCI_CONFIG_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s).

Generally, if new functionality is provided in a processor, its supporting firmware is revised to support such new functionality. For example, if a new cache is implemented in a processor, its supporting firmware, such as its PAL, is typically modified to support the new cache. Further, for certain changes to a processor, the OS with which the processor is to be used may need to be modified to recognize those changes. For instance, the OS may need to have new procedure calls implemented for accessing new features implemented in a processor. Thus, as developers expand the functionality of their processors, they generally implement new supporting firmware and/or modify the OS to recognize the new functionality.

SUMMARY

According to one embodiment of the present invention, a system comprises at least one processor, and supporting firmware for supporting at least one function of the at least one processor. The system further comprises logic operable to expand the functionality of the at least one function in a fashion that is not natively supported by the supporting firmware, and an interposer for supporting the expanded functionality of the at least one function.

According to another embodiment, a method for expanding the functionality of an execution unit of a system is provided. The method comprises implementing an execution unit in a system, and implementing pre-existing support firmware for the execution unit in the system, wherein the pre-existing support firmware supports at least one function of the execution unit. The method further comprises implementing logic expanding the at least one function in a manner not supported by the pre-existing support firmware, and implementing an interposer to support the expansion of the at least one function.

According to another embodiment, a method for supporting an expanded function of an execution unit of a system is provided. The method comprises intercepting a call intended for support firmware of an execution unit of a system. The method further comprises determining whether the call is for an expanded function of the execution unit that is not supported by the support firmware, and if the call is for such an expanded function, using logic other than the support firmware to support the call for the expanded function.

According to another embodiment, a system is provided that comprises at least one execution unit, and a first layer of supporting firmware for supporting the at least one execution unit. The system further comprises a second layer of supporting firmware for supporting an enhancement to the at least one execution unit, wherein the enhancement is not supported by the first layer of supporting firmware and wherein the second layer of supporting firmware comprises an interface that is transparent to the first layer of supporting firmware.

According to another embodiment, a system comprises at least one processor, and Processor Abstraction Layer (PAL) firmware for supporting a function of the at least one processor. The system further comprises logic expanding the function of the at least one processor in a fashion that is not natively supported by the PAL firmware, and interposer firmware for supporting the expanded functionality.

DETAILED DESCRIPTION

Figure 1:
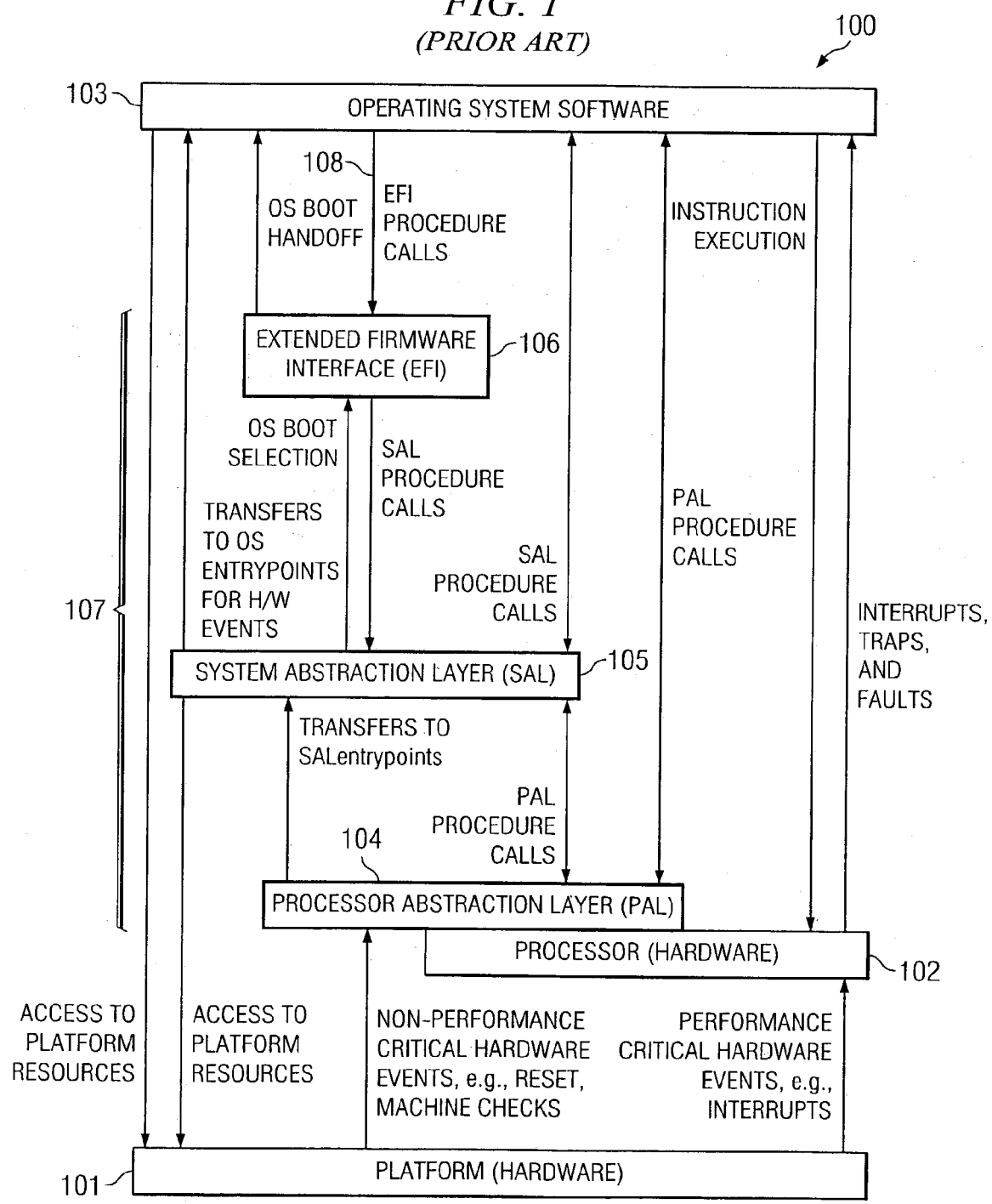
FIG. 1 shows an example a block diagram of a traditional IA-64 architecture system in which embodiments of the present invention may be implemented.

In many situations, it becomes desirable for a developer to expand the functionality of a processor without altering the pre-existing supporting firmware of the processor. Further, it may be desirable to expand the functionality of a processor without altering the OSs that support such processor. For example, in an IA-64 (or other IA), it may be desirable to extend the functionality of the processor(s) implemented in a system without requiring modification to the pre-existing IA-64 supporting architectural components, such as PAL, SAL, or the OS.

As described further below, a processor's functionality may be expanded by a developer in many different ways. For instance, a new cache may be implemented for processor(s), fixes or work-arounds for bugs in the processor(s) may be implemented, and/or various other types of expansions to the processor(s) original functionality may be implemented. Thus, for example, an Original Equipment Manufacturer (OEM) may use a processor (e.g., an IA-64 processor) in a system that the OEM is developing, and the OEM may desire to add further functionality to the existing IA-64 processor. In many instances, the developer (e.g., OEM) is unable (or unwilling) to modify the existing supporting firmware for the processor that the OEM is using. For example, in the IA-64 architecture, the OEM may not have access to the code of the PAL firmware and/or the OEM may not have legal rights to modify such PAL firmware (e.g., the processor developer may not grant the OEM the right to modify their PAL firmware). Thus, the OEM may desire to expand the processor's functionality in some way, such as by adding a new cache to the processor, but the OEM may be unable/unwilling to modify the PAL firmware such that it will support the expanded functionality.

As described further below, embodiments of the present invention enable a processor's functionality to be expanded without requiring modification to pre-existing supporting firmware of the processor. More particularly, pre-existing supporting firmware may be implemented for supporting a particular function of a processor, and embodiments of the present invention enable the particular function to be expanded without requiring modification to the pre-existing supporting firmware. That is, a given functionality that is architecturally accommodated by pre-existing supporting firmware may be expanded without modifying the pre-existing supporting firmware for supporting the expanded functionality. As an example, in the IA-64 architecture, pre-existing PAL firmware generally accompanies the processor and supports certain functions of the processor, such as access to the processor's cache (e.g., enables the OS to query the processor to determine the number, size, etc. of its cache(s)). An embodiment of the present invention enables an additional cache to be implemented for such an IA-64 processor without requiring modification to its pre-existing PAL firmware.

In an embodiment of the present invention, an "interposer" is provided that intercepts procedure calls (e.g., from the OS) directed to the PAL firmware, and if the calls are related to an expanded functionality not supported by the pre-existing PAL firmware, the interposer supports the expanded functionality (e.g., returns information relating to the expanded functionality). In other words, the interposer "poses" as the PAL firmware for supporting an expanded functionality of which the pre-existing PAL firmware is unaware. If an intercepted call is related to a functionality that is supported by the pre-existing PAL firmware, the interposer passes such call through to the pre-existing PAL firmware. Thus, the processor's functionality may be expanded and such expanded functionality may be supported by an interposer such that the pre-existing supporting firmware (e.g., PAL) is not required to be modified. Accordingly, an embodiment of the present invention enables an extended function to be implemented that is transparent to the OS and to the PAL. That is, an embodiment of the present invention enables an extended function to be implemented with support for the extended function provided by an interposer, and the interfaces for the interposer are transparent to the OS and PAL (e.g., it appears to that OS and PAL that they are communicating directly with each other. In addition, there are interactions between PAL and SAL which are also architected (noted as TRANSFERS to SAL entry-points in FIG. 1) which the interposer intercepts without either SAL or PAL noticing this fact.

FIG. 1 shows an example context in which embodiments of the present invention may be implemented. More particularly, FIG. 1 shows a block diagram of a traditional IA-64 architecture system. While embodiments of the present invention are applicable to other processor architectures to enable a processor's functionality to be expanded without requiring modification to the processor's pre-existing supporting firmware, certain embodiments are particularly applicable to the IA-64 architecture and thus many examples used herein are directed to the IA-64 architecture. Accordingly, the traditional IA-64 architecture is described briefly in conjunction with FIG. 1. The quintessential model of the IA-64 architecture is given in the *Intel IA-64 Architecture Software Developer's Manual Volume 2: IA-64 System Architecture*, in section 11.1 Firmware Model, the disclosure of which is hereby incorporated herein by reference.

FIG. 1 shows an abstract model of an example system 100, which comprises hardware platform 101, processor(s) 102, OS 103, and system firmware 107. In this example implementation, supporting system firmware 107 comprises PAL 104, SAL 105, and EFI 106. PAL 104, SAL 105, and EFI 106 together provide, among other things, the processor and system initialization for an OS boot. Hardware platform 101 represents the collection of all of the hardware components of system 100, other than the system's processors 102.

The arrows shown in the abstract model of FIG. 1 between these various components indicate the types of permitted interactions for the behavior of system 100. When system 100 is first powered on, there are some sanity checks (e.g., power on self-test) that are performed by microprocessors included in platform 101, which are not the main system processors 102 that run applications. After those checks have passed, power and clocks are given to processor 102. Processor 102 begins executing code out of the system's Read-Only Memory (ROM) (not specifically shown in FIG. 1). The code that executes is the PAL 104, which gets control of system 100. PAL 104 executes to acquire all of the processors 102 such that the processors begin executing concurrently through the same firmware.

After it has performed its duty of initializing the processor(s) 102, PAL 104 passes control of system 100 to SAL 105. It is the responsibility of SAL 105 to discover what hardware is present on platform 101, and initialize it to make it available for the OS 103, primarily main memory. When main memory is initialized and functional, the firmware 107 (i.e., PAL 104, SAL 105, and EFI 106, which is not running yet) is copied into the main memory. Then, control is passed to EFI 106, which is responsible for activating boot devices, which typically includes the disk. EFI 106 reads the disk to load a program into memory, typically referred to as an operating system loader. EFI 106 loads the OS loader into memory, and then passes it control of system 100 by branching one of the processors 102 (typically called the boot startup processor) into the entry point of such OS loader program.

The OS loader program then uses the standard firmware interfaces 107 to discover and initialize system 100 further for control. One of the things that the OS loader typically has to do in a multi-processor system is to retrieve control of the other processors. For instance, at this point in a multi-processor system, the other processors may be executing in do-nothing loops. In an Advanced Configuration and Power Interface (ACPI)-compatible system, OS 103 makes ACPI calls to parse the ACPI tables to discover the other processors of a multi-processor system 100 in a manner as is well-known in the art. Then OS 103 uses the firmware interfaces 107 to cause those discovered processors to branch into the operating system code. At that point, OS 103 controls all of the processors and the firmware 107 is no longer in control of system 100.

As OS 103 is initializing, it has to discover from the firmware 107 what hardware is present at boot time. And in the ACPI standards, it also discovers what hardware is present or added or removed at run-time. Further, the supporting firmware (PAL, SAL, and EFI) are also used during system runtime to support the processor. For example, OS 103 may access a particular function of the processor 102 via the supporting firmware 107, such as querying the firmware (PAL) for the number, size, etc., of the processor's cache. Some other well-known firmware functions that OS 103 may employ during runtime include: (a) PAL 104 may be invoked to configure or change processor features such as disabling transaction queueing (PAL_BUS_SET_FEATURES); (b) PAL 104 may be invoked to flush processor caches (PAL_CACHE_FLUSH), which is one of the functions that the HONDO embodiment of the present invention (described below) interposes on; (c) SAL 105 may be invoked to retrieve error logs following a system error (SAL_GET_STATE_INFO, SAL_CLEAR_STATE_INFO); (d) SAL 105 may be invoked as part of hot-plug sequences in which new I/O cards are installed into the hardware (SAL_PCI_CONFIG_READ, SAL_PCI_CONFIG_WRIT); (e) EFI 106 may be invoked to change the boot device path for the next time the system reboots (SetVariable); (f) EFI 106 may be invoked to change the clock/calendar hardware settings; and (g) EFI 106 may be invoked to shutdown the system (ResetSystem).

The interfaces that the firmware model of FIG. 1 illustrates (EFI procedure calls, SAL Procedure Calls, PAL Procedure Calls, Transfers to SAL entrypoints, OS Boot Handoff, OS entrypoints for hardware events) are all architecturally defined. Any IA-64 hardware system that complies with this model should work with any OS that also complies with this model. The architecture definition is interface-based, however, and the internal implementation of the firmware (SAL and EFI) is not specified by the architecture. Only the interfaces between the firmware and the OS and the PAL and the SAL are specified by this architecture. Therefore, vendors are free to innovate within their firmware implementation provided they adhere to both the architectural (and legal) requirements of employing INTEL-developed PAL with INTEL-developed Processors (e.g., ITANIUM, MADISON, etc.).

During the boot-up process of the above-described architecture, the platform SAL 105 (generally written by the OEM who resells the IA-64 processors and PAL 104 in a system) copies PAL 104 into main memory. SAL 105 writes an address to architected EFI tables identifying the entry point to the PAL procedure. OS 103, in turn, retrieves the address for the PAL procedures and employs it whenever calling the PAL procedures. The choice of where PAL 104 is placed (and thus where its entrypoint resides) is entirely up to the platform firmware (SAL 105). As described further below, embodiments of the present invention interpose the PAL procedure calls in a new Non-PAL firmware module (referred to as an interposer) that enables the functionality of the processor to be extended without requiring changes to the pre-existing PAL 104 or to the OS 103. More particularly, in one embodiment, the address provided to OS 103 by SAL 105 identifying the entrypoint to the PAL 104 actually identifies an entrypoint to the interposer module. Thus, all calls made to PAL 104 are actually directed to the interposer module.

Accordingly, the interposer module is capable of intercepting the calls to PAL 104 and supporting an extended functionality of the processor architecture. For instance, as described further below, a particular function that is supported by the pre-existing PAL 104 (e.g., access to cache) may be expanded (e.g., by addition of another cache) within the architecture of system 100, and the interposer module (not shown in FIG. 1) may be used to support the expansion of the particular function (e.g., to support access to the added cache) without requiring any modification to the pre-existing PAL 104. Preferably, the interposer module makes it appear to the OS 103 as though the pre-existing PAL 104 was supporting the expanded processor functionality, so no OS changes are required. In effect, the interposer module of one embodiment appears as PAL to the OS, but it appears as SAL to the PAL.

As mentioned above, it may be desirable to extend the functionality of the processor in various different ways. More particularly, a given function of the processor may be supported by pre-existing supporting firmware (e.g., PAL firmware) for the processor, and the given function may be expanded in some way (e.g., by an OEM) without requiring modification to the supporting firmware for supporting the expansion of the given function. One example of extending the functionality of the processor is described hereafter in conjunction with FIGS. 2A, 2B, and 3–6 in which a cache is added. Other examples of extended functionality that may be implemented for a processor are described in conjunction with FIGS. 7 and 8 below.

In one embodiment of the present invention, interposer firmware described further below is implemented to support an extended cache functionality provided by an added "Sherpa" cache controller. Accordingly, for this embodiment, it is appropriate to further consider the "Sherpa" cache implementation. The Sherpa External Reference Specification Rev 0.4, the disclosure of which is hereby incorporated herein in its entirety and hereinafter referred to as the "Sherpa ERS", provides in part:

2.1 Introduction

Sherpa is a cache-controller and bus-bridge chip for iA-64, processors that reside on the MCKINLEY bus (slot K). It is intended to be used with iA-64 CPU's to provide the performance and scaling requirements for high-end iA-64 systems in the 2002–2003 timeframe. While Sherpa's schedule and performance benefits best align with the MADISON processor, it is compatible with any MCKINLEY bus based iA-64 CPU (MCKINLEY or MADISON). Sherpa is targeted for high-end server and workstation applications, both commercial and technical. Sherpa will enable iA-64 to better compete with IBM's Power4 systems by providing two iA-64 processor cores and 32 MB of cache housed in a module that operates in the same space, power, and thermal constraints as a single MCKINLEY module.

2.1.1 Sherpa Overview

Sherpa is sometimes called an "in-line" cache because it logically resides between a processor(s) and the memory agent. See FIG. 2-1 [FIG. 2B herein]. From the processor's perspective Sherpa acts as the memory agent (the central agent on the upper MCKINLEY bus), whereas from the actual memory agent's perspective Sherpa acts as if it were a processor (a symmetric agent on the lower MCKINLEY bus). Sherpa has two major value propositions: it provides a large, off-chip (32 MB) cache for iA-64 processors, and it allows for adding more iA-64 processors to a system without presenting additional bus loads to the local memory agent.

Figure 2A:
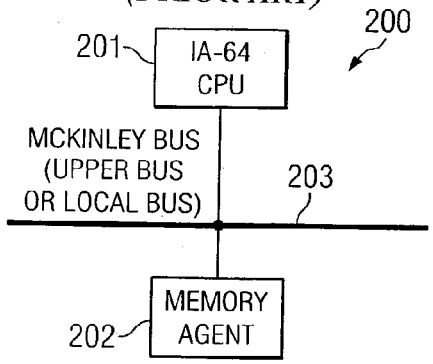
FIG. 2A shows a traditional IA-64 MCKINLEY bus-based design.
Figure 2B:
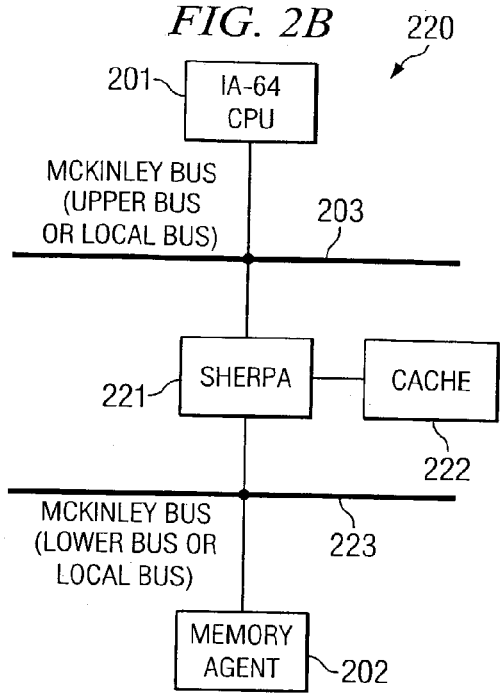
FIG. 2B shows an IA-64 MCKINLEY bus-based design employing a Sherpa cache that resides between the IA-64 processor and its connection to the main memory system.

As can be seen in FIGS. 2A–2B, which compare a nominal IA-64 MCKINLEY bus-based design (FIG. 2A) to one employing Sherpa (FIG. 2B), the Sherpa basically resides between the IA-64 processor and its connection to the main memory system. That is, the nominal IA-64 MCKINLEY bus-based system 200 of FIG. 2A comprises an IA-64 processor 201 and a memory agent 202 accessible via the upper (or local) MCKINLEY bus 203. Sherpa system 220 of FIG. 2B also comprises IA-64 processor 201 and memory agent 202. However, Sherpa controller 221 logically resides between processor 201 and memory agent 202. As described in the Sherpa ERS, from the perspective of processor 201, Sherpa controller 221 acts as the memory agent (the central agent on the upper MCKINLEY bus 203), whereas from the perspective of the actual memory agent 202, Sherpa controller 221 acts as if it were a processor (a symmetric agent on the lower MCKINLEY bus 223). As also described in the Sherpa ERS, Sherpa has two major value propositions: 1) it provides a large, off-chip (32 MB) cache 222 for IA-64 processor 201, and 2) and it allows for adding more IA-64 processors to a system without presenting additional bus loads to the local memory agent 202.

Accordingly, in the example of FIG. 2B, memory agent 202 "thinks" it is connected to an IA-64 CPU 201, and the IA-64 CPU 201 "thinks" it is connected to a Memory Agent 202. However, there is a complex cache controller 221 logically interposed between them. Because of this design, the Sherpa device allows construction of a processor module that contains two IA-64 processors where the nominal (non-interposed) design of system 200 of FIG. 2A permits only one.

Figure 3:
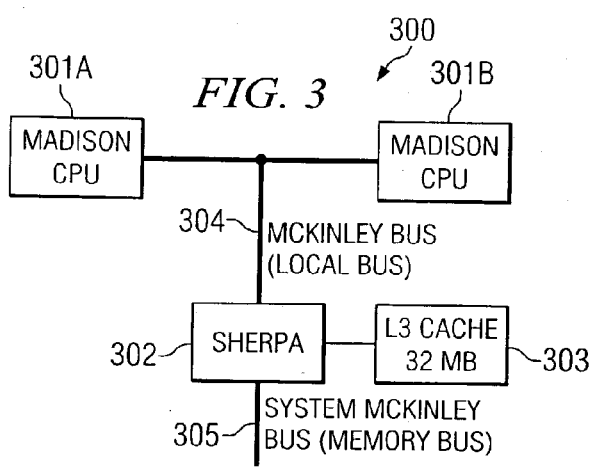
FIG. 3 shows an example block diagram of a HONDO module that contains two IA-64 processors, and a shared Sherpa Cache in a common physical package for which certain embodiments of the present invention may be implemented.

For instance, a module code-named "HONDO" may be implemented, which contains two MADISON processors, the Sherpa Cache controller 221 and cache RAM 222 in the same physical package as a standard MCKINLEY package. An example block diagram of such a HONDO module that contains two IA-64 processors is shown in FIG. 3. As shown, example processor module 300 (or "HONDO" module) comprises two MADISON processors 301A and 301B. Module 300 further comprises Sherpa Cache controller 302 (which corresponds to Sherpa Controller 221 of FIG. 2B) communicatively coupled to processors 301A and 301B via the local MCKINLEY Bus 304. As further shown, an L3 cache 303 (which corresponds to cache 222 of FIG. 2B) is also provided. Sherpa controller 302 is also communicatively coupled to the system MCKINLEY bus (memory bus) 305. Thus, the L3 cache 303 is shared by the two processors 301A and 301B. Further, the HONDO module 300 may be connected to a socket on the MCKINLEY system bus 305. Thus, two processors 301A and 301B may be implemented at each socket, as opposed to only one processor at each socket.

Figure 4:
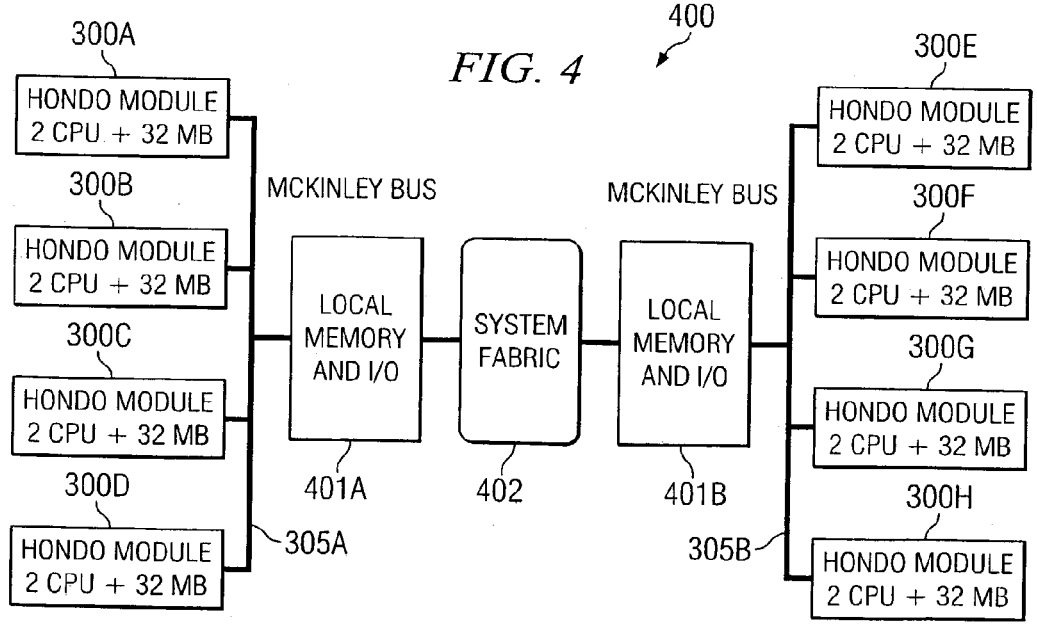
FIG. 4 shows an example system 400 implementing a plurality (i.e., 8) of the HONDO modules of FIG. 3.

Turning to FIG. 4, an example system 400 implementing a plurality (i.e., 8) of the HONDO modules 300 of FIG. 3 is shown. More specifically, HONDO modules 300A–300H are implemented in system 400, wherein each HONDO module 300A–300H corresponds to the module 300 of FIG. 3. Accordingly, each of the HONDO modules 300A–300H comprise two MADISON processors (301A and 301B of FIG. 3), Sherpa controller 302, and L3 cache 303. As shown in FIG. 4, each of the HONDO modules 300A–300D is communicatively coupled to a socket on a first MCKINLEY bus 305A to enable access to local memory and input/output (I/O) 401A, and each of the HONDO modules 300E–300H is communicatively coupled to a socket on a second MCKINLEY bus 305B to enable access to local memory and I/O 401B.

Hardware elements 401A and 401B represent subsystems that provide main memory (RAM) that is situated "proximal" to the processors communicatively coupled by bus 305A. This memory in such a system would typically provide a lower latency of access as seen by the processors proximal to it than by processors more distal. Similarly, these elements might include or provide connections to I/O controllers and peripherals. Though the system 400 implements a symmetric address space model in which each device in the system is accessible by direct access from any processor in the system, the latencies of these accesses may vary. Such system is typically said to exhibit Non-Uniform Memory Access (NUMA) characteristics. Such systems are typically more scalable to larger numbers of hardware elements, which is the reason the latency disadvantage is acceptable. The System Fabric element 402 represents a communication network that passes the load/store transactions maintaining full semantics such as coherency. Typical embodiments in similar systems utilize non-blocking crossbar technology or torroidal or mesh networks.

It should be recognized that by implementing HONDO modules 300A–300H, system 400 of FIG. 4 contains 16 IA-64 processors instead of the maximum of 8 IA-64 processors that would be achieved if standard MCKINLEY or MADISON processors were implemented. That is, implementing the HONDO modules doubles the number of processors that would otherwise be achieved in system 400 if a standard MCKINLEY or MADISON processor were implemented at each location at which the HONDO modules are implemented in system 400.

Figure 5:
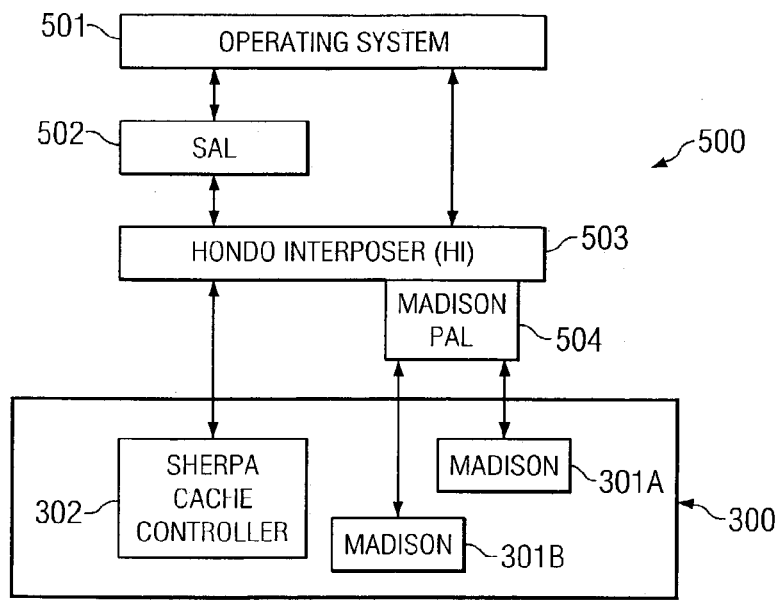
FIG. 5 shows a block diagram of an example implementation of a HONDO Module of FIG. 3 within a system using interposer firmware of an embodiment of the present invention to enable the extended Sherpa Cache functionality without requiring any modification to the pre-existing supporting MADISON PAL firmware.

FIG. 5 shows a block diagram of an example implementation of a HONDO Module 300 within a system 500 using interposer firmware 503 (referred to as a "HONDO Interposer" in this example) to enable the extended Sherpa Cache functionality without requiring any modification to the pre-existing supporting MADISON PAL firmware 504. System 500 comprises OS 501 (which corresponds to OS 103 of FIG. 1), SAL 502 (which corresponds to SAL 105 of FIG. 1), and HONDO module 300 (of FIG. 3). As described above with FIG. 3, HONDO module 300 comprises two MADISON processors 301A and 301B, and a Sherpa Cache Controller 302. The traditional MADISON PAL 504 supporting firmware is implemented in system 500 for supporting certain functions of MADISON processors 301A and 301B. For example, MADISON processors 301A and 301B may each comprise L1 and L2 caches that MADISON PAL 504 supports.

Because HONDO Module 300 extends the cache functionality of processors 301A and 301B in a manner that is not supported by the existing MADISON PAL 504 (i.e., adds a shared L3 cache 303), HONDO interposer 503 is also included in system 500 for supporting this extended cache functionality. For instance, as described above, SAL 502 may be implemented to provide OS 501 with an entry point address for PAL procedure calls, which identifies an entry point address to HONDO interposer 503, rather than for MADISON PAL 504 such that calls made by OS 501 to MADISON PAL 504 are actually directed to HONDO interposer 503. As indicated by the communication arrows in FIG. 5, if a PAL procedure call made by OS 501 is for a procedure (or functionality) supported by MADISON PAL 504, HONDO interposer 503 passes such procedure call through to MADISON PAL 504 and it supports such procedure call in a typical manner. However, if the procedure call made by OS 501 is for a procedure (or functionality) that involves an extended function not supported by MADISON PAL 504, then HONDO interposer 503 supports such extended function. For instance, HONDO interposer 503 is communicatively coupled to Sherpa Cache controller 302 to support the added cache functionality provided by HONDO module 300, which is not supported by MADISON PAL 504.

In this embodiment, the Sherpa cache is transparent to the OS. That is, OS 501 does not see or need to explicitly manage the Sherpa cache 302 for correct system operation. This requirement arises in this example embodiment because the existing PAL architecture and implementation for MADISON has no ability to manage a cache that is shared by two different processor cores. Caches are expected to be separate and individually managed by PAL calls directly. Thus, the PAL_CACHE$_{13}$ FLUSH function is an example function that HONDO interposer 503 performs for a flush of the Sherpa cache without either OS 501 or PAL 504 needing to know this (i.e., operation is performed transparently). Responsive to a flush cache function invoked by OS 501, HONDO interposer 503 invokes the PAL_CACHE_FLUSH and then also performs operations to flush all of the Sherpa cache before returning to OS 501.

Figure 6:
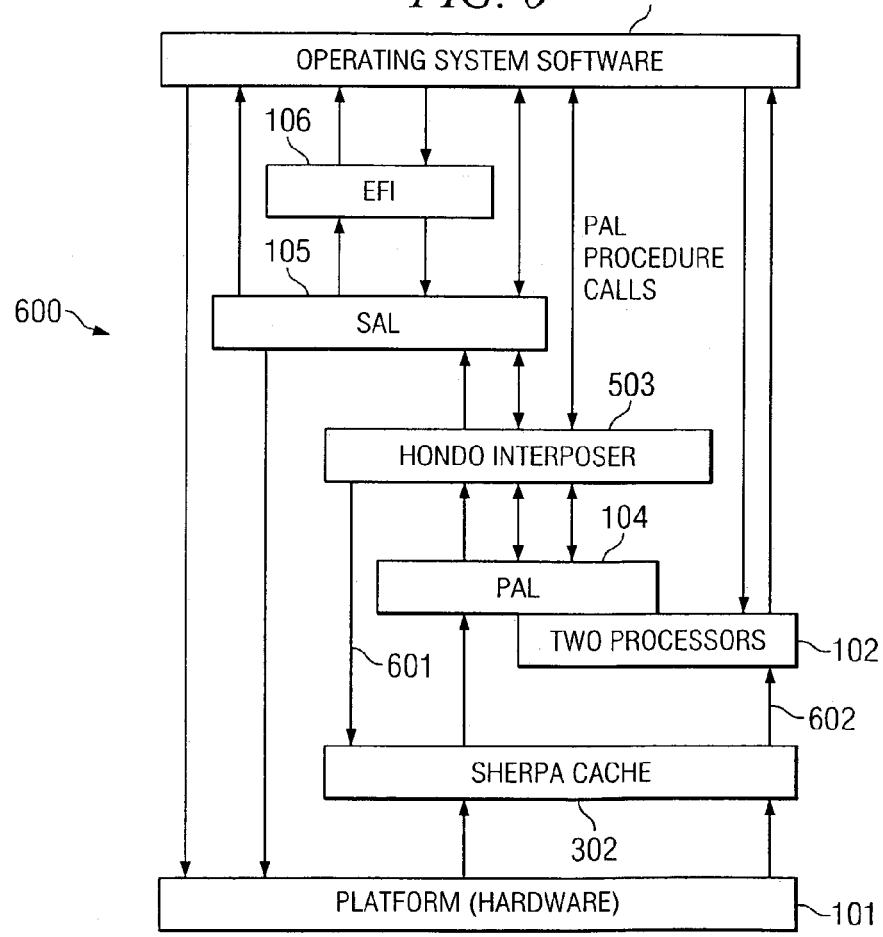
FIG. 6 shows an example system that illustrates the IA-64 architecture of FIG. 1 as modified in accordance with an embodiment of the present invention to implement a HONDO interposer to support the Sherpa cache of a HONDO module implemented in a system.

FIG. 6 shows an example system 600 that illustrates the IA-64 architecture of FIG. 1 as modified in accordance with an embodiment of the present invention to implement the HONDO interposer 503 to support the Sherpa cache 302. It should be recognized that as with the IA-64 architecture of FIG. 1, system 600 comprises OS 103 and hardware platform 101. System 600 also comprises processor 102 (which actually comprises 2 MADISON processors in this example implementation) and supporting firmware for such processors, such as PAL 104, SAL 105, and EFI 106. The interaction between the various components are again illustrated as arrows. It should be recognized that the interactions are the same as in the traditional IA-64 architecture of FIG. 1, except for the interactions on which HONDO interposer 503 interposes. In system 600, HONDO interposer 503 is implemented to intercept communication directed to (or intended for) PAL 104, such as the PAL procedure calls (e.g., PAL_CACHE_FLUSH call, etc.) made by OS 103.

As shown, communication 601 illustrates HONDO interposer 503 accessing Sherpa cache 302. For example communication 601 may perform a flush of the Sherpa cache 302 responsive to an OS procedure call of PAL_CACHE_FLUSH intercepted by HONDO interposer 503. In this example implementation, the accesses, such as access 601, to Sherpa cache 302 are not function calls because there is no firmware stored inside Sherpa cache 302 (of course, in other embodiments, the logic implementing such an extended functionality of a processor may be capable of receiving function calls from the interposer). In the example implementation of FIG. 6, the accesses to Sherpa cache 302 are register accesses. Thus, communication 601 represents HONDO interposer 503 accessing Sherpa registers such as error log registers, control registers (e.g., to flush the cache), and diagnostic registers (e.g., for tests in which the cache is not transparent but is actually being tested by software that is aware of its presence). The other communication arrows of FIG. 6 represent the corresponding communications shown in FIG. 1. For instance, communication 602 is the same function as the function labeled "Performance Critical Hardware Events, e.g., Interrupts" in FIG. 1, which is a passthrough the processors 102 to OS 103 as signals into the OS. In this example implementation, PAL 104 is unaware of the existence of Sherpa cache 302, but PAL 104 is aware of the bus on which Sherpa cache 302 resides.

Figure 7:
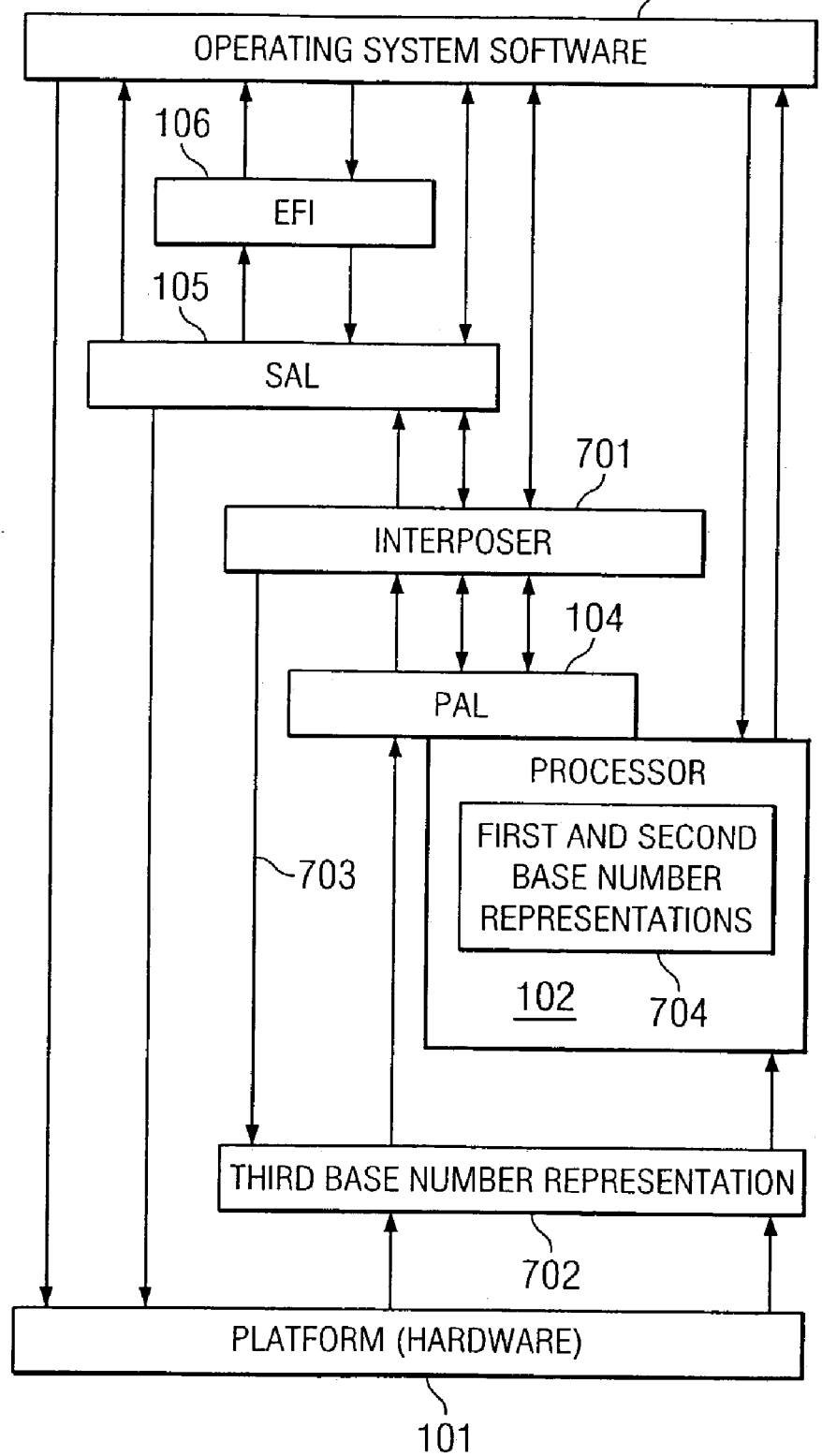
FIG. 7 shows an example system in which a processor comprises functionality for first and second base number representations that may be used by such processor, and the system comprises logic extending such functionality of the processor to provide a third base number representation that may be used by the processor, wherein such third base number is not supported by the processor's pre-existing support firmware.

As mentioned above, various other types of extensions to the functionality of a processor may be implemented instead of or in addition to the extended cache described above. For example, FIG. 7 shows an example system 700 in which processor 102 comprises functionality 704 for first and second base number representations that may be used by such processor (e.g., binary and base-4 number representations). Because processor 102 was developed having this functionality 704, the pre-existing PAL support firmware 104 was also developed with the ability to support such functionality. However, an OEM may extend such functionality 704 of processor 102 by implementing functionality 702 that provides a third base number representation (e.g., base-5 number representation) that may be used by the processor. Pre-existing PAL 104 is unaware of such extended functionality 702 that provides a third base number representation and therefore is unable to support that functionality. However, interposer 701 is implemented to support the extended functionality 702 (via communication 703) for providing a third base number representation.

Figure 8:
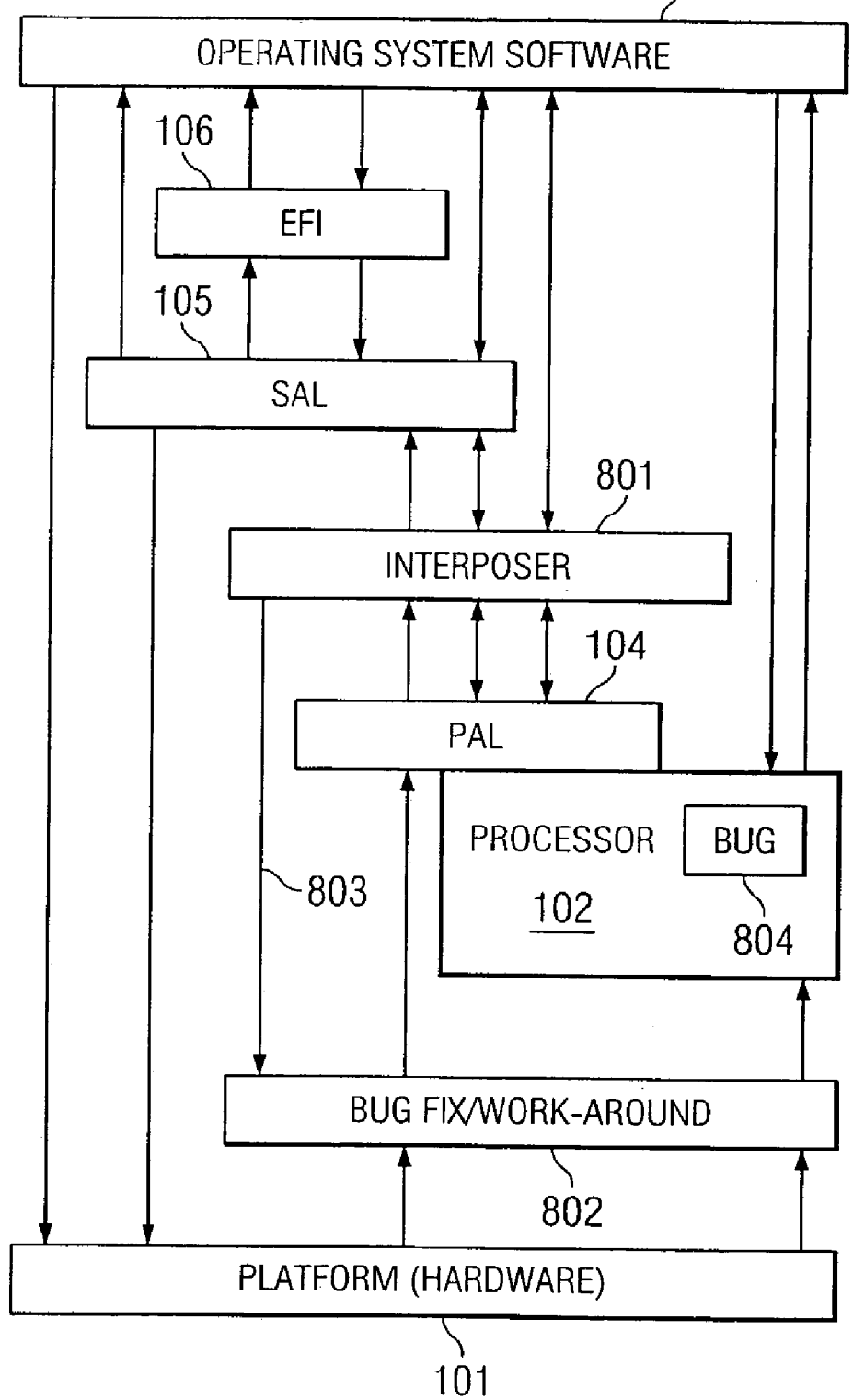
FIG. 8 shows an example system in which a processor comprises a bug, and such system comprises logic that provides a fix (or work-around) for the bug that is not supported by the processor's pre-existing support firmware.

As another example, FIG. 8 shows an example system 800 in which processor 102 comprises functionality 804 which is a bug (i.e., a defective function). Because processor 102 was developed having this bug 804, the pre-existing PAL support firmware 104 was also developed with the ability to support such bug (e.g., to support procedure calls that invoke the bug 804). An OEM may extend the functionality of processor 102 by implementing functionality 802 that provides a fix (or work-around) for the bug 804. Pre-existing PAL 104 is unaware of such functionality 802 that provides a fix for bug 804 and therefore is unable to support that functionality. However, interposer 801 is implemented to support the functionality 802 for providing a fix for bug 804. For instance, interposer 801 may intercept procedure calls that would otherwise invoke bug 804 (if passed through to PAL 104), and instead pass those procedure calls via communication 803 to bug fix/work-around module 802 which invokes some action to prevent the bug from being encountered.

Figure 9:
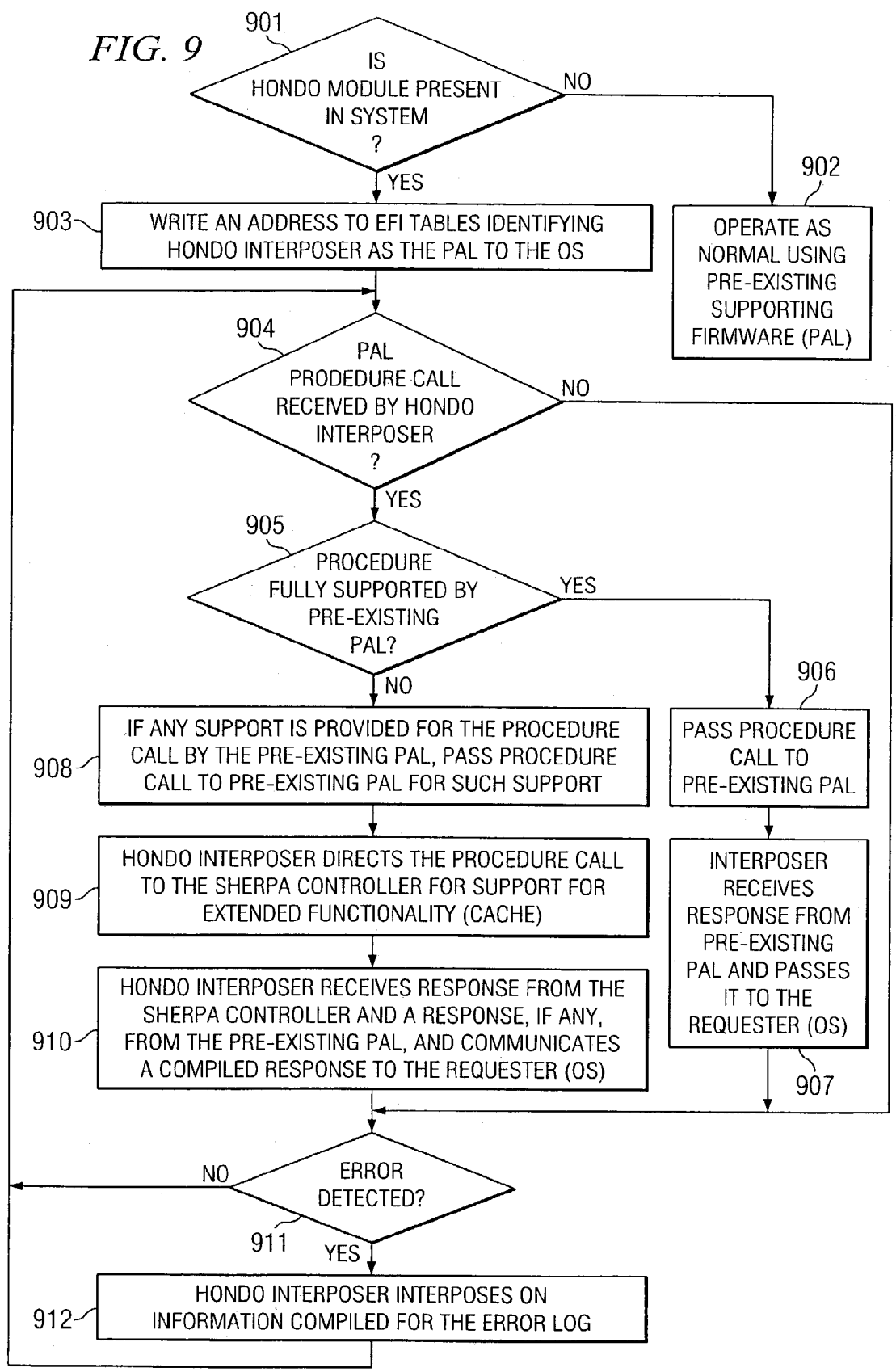
FIG. 9 shows an example operational flow diagram of one embodiment of the present invention.

Turning to FIG. 9, an example operational flow diagram of one embodiment of the present invention is shown. The example operational flow of FIG. 9 is for one embodiment of a system that comprises a HONDO module 300 and HONDO interposer 503, such as the systems described above in FIGS. 5 and 6. Of course, as will be recognized by those of ordinary skill in the art, the example operational flow of FIG. 9 may be readily adapted for application to other types of extended processor functions, such as those identified above with FIGS. 7 and 8. In operational block 901, the HONDO interposer firmware 503 determines whether the HONDO module 300 is present in the system. Such determination may be made during the boot-up process of the system. For instance, as described above, certain systems may comprise a single processor (e.g., MADISON processor) coupled to each socket of the McKinley bus. However, other implementations may comprise a HONDO module 300 that includes two processors (301A and 301B) and a shared L3 cache for such processors (a SHERPA cache). If the HONDO module is not discovered as being implemented in the system, then the boot-up process continues in a traditional fashion and the system operates in a traditional manner using pre-existing supporting firmware (e.g., MADISON PAL 504 for a MADISON processor) in block 902.

On the other hand, if a HONDO module is discovered as implemented in the system in block 901, operation advances to block 903. In block 903, SAL 105 (labeled as SAL 502 in FIG. 5) writes an address to EFI tables identifying the HONDO interposer 503 as the PAL to the OS 103 (labeled OS 501 in FIG. 5). Thus, as described above, an entrypoint address for PAL procedure calls actually identifies HONDO interposer 503, rather than the pre-existing PAL firmware. Thus, a requester (e.g., the OS) making a PAL procedure call "thinks" it is making the call to the pre-existing PAL, but the procedure call is actually directed to the HONDO interposer 503.

In block 904, it is determined whether a PAL procedure call is made by a requester (e.g., by the OS). More particularly, the HONDO interposer 503 determines whether it has received a PAL procedure call. If a procedure call is not received, then operation advances block 911 described further below. Once a PAL procedure call is received by the HONDO interposer 503, operation advances from block 904 to block 905 whereat the HONDO interposer 503 determines whether called PAL procedure is fully supported by the pre-existing PAL. There are many PAL procedure calls that are fully supported by the pre-existing PAL when the HONDO module 300 is included in the system. One is the well-known PAL_PERF_MON_INFO function. This function Returns Performance Monitor information about what can be counted and how to configure the monitors to count the desired events. This feature is used to tune system software and applications for maximal performance. It is completely processor-specific and there is no need for the interposer to "interfere" with this function. It is one of the many "pass-thru" operations in which the HONDO interposer 503 is simply a do-nothing "gasket" (or adapter) between the OS and the PAL.

If it is determined at block 905 that the called PAL procedure is fully supported by the pre-existing PAL, operation advances to block 906 whereat the HONDO interposer 503 passes the PAL procedure call to the pre-existing PAL (e.g., to MADISON PAL 504 of FIG. 5). In operational block 907, the HONDO interposer 503 receives a response to the procedure call from the pre-existing PAL and passes the response to the requester (e.g., OS). Operation then advances to block 911 described further below.

If, on the other hand, it is determined at block 905 that the called PAL procedure is not fully supported by the pre-existing PAL, operation advances to block 908. At block 908, if any support is provided for the procedure call by the pre-existing PAL, the HONDO interposer 503 passes the procedure call to the pre-existing PAL for such support. For example, if the procedure call queries the number of levels of cache, such procedure may be passed to the pre-existing PAL for partial support (e.g., the pre-existing PAL is aware of the two levels of cache, L1 and L2, implemented for a MADISON processor). In block 909, the HONDO interposer 503 directs the procedure call to the SHERPA Controller 302 for support for the extended functionality (e.g., L3 cache) that is not supported by the pre-existing PAL 504. In block 910, the HONDO interposer 503 receives a response from the SHERPA controller 302 and a response, if any, from the pre-existing PAL 504, and the HONDO interposer 503 communicates a response (e.g., that comprises information compiled from the responses of the pre-existing PAL and the SHERPA controller) to the requester (e.g., OS). Operation then advances to block 911.

At block 911, it is determined whether an error is detected. If an error is detected, the HONDO interposer 503 interposes on information compiled for the error log in block 912. Thus, HONDO interposer 503 may interpose on interactions performed during an error state to provide information regarding the extended functionality that it supports (e.g., the SHERPA chache) Thereafter, the system may be halted for certain errors, or once the error is logged operation may return to block 904 for certain errors (as shown in the example of FIG. 9). Otherwise, if no error is detected in block 912, operation returns to block 904.

What is claimed is:

1. A system comprising:
at least one processor;
supporting firmware for supporting at least one function of said at least one processor, wherein said at least one function of said at least one processor comprises access to said at least one processor's cache;
logic operable to expand the functionality of said at least one function in a fashion that is not natively supported by said supporting firmware; and
an interposer for supporting said expanded functionality of said at least one function, said interposer communicatively coupled to said firmware to intercept calls to said firmware.

2. The system of claim 1 wherein said at least one processor comprises an Intel Architecture (IA)-64 processor.

3. The system of claim 2 wherein said supporting firmware comprises Processor Abstraction Layer (PAL) firmware.

4. The system of claim 1 wherein supporting said expanded functionality comprises intercepting and returning information relating to said expanded functionality.

5. The system of claim 1 wherein said logic operable to expand the functionality of said at least one function comprises logic providing access to an expanded cache for said at least one processor.

6. A system comprising:
at least one processor;
supporting firmware for supporting at least one function of said at least one processor;
logic operable to expand the functionality of said at least one function in a fashion that is not natively supported by said supporting firmware;
an interposer for supporting the expanded functionality of said at least one function, wherein said interposer comprises an interface that is transparent to said supporting firmware; and
an initiator for initiating the expanded functionality, wherein said interposer intercepts a call from said initiator intended for said supporting firmware and wherein said call comprises a call to flush a cache of said at least one processor.

7. The system of claim 6 wherein supporting said expanded functionality comprises intercepting and returning information relating to said expanded functionality.

8. The system of claim 6 wherein said initiator comprises an operating system.

9. The system of claim 6 wherein said interposer comprises an interface that is transparent to said initiator.

10. A method for expanding the functionality of an execution unit of a system, said method comprising:
implementing an execution unit in a system;
implementing pre-existing support firmware for said execution unit in said system, wherein said pre-existing support firmware supports at least one function of said execution unit;
implementing logic expanding said at least one function in a manner not supported by said pre-existing support firmware;
implementing an interposer to support the expansion of said at least one function, said interposer intercepting calls to said firmware; and
wherein said at least one function supported by said pre-existing support firmware comprises access to a first cache, and wherein the expansion of said at least one function comprises access to an additional cache.

11. The method of claim 10 wherein supporting said expansion of said at least one function comprises intercepting and returning information relating to said expanded functionality.

12. The method of claim 10 wherein said interposer comprises an interface that is transparent to said supporting firmware.

13. The method of claim 10 further comprising:
implementing said interposer to intercept calls from an initiator intended for said pre-existing support firmware.

14. The method of claim 13 further comprising:
providing said initiator an address for said interposer to be used by said initiator in accessing said pre-existing support firmware.

15. The method of claim 13 wherein said initiator comprises an operating system.

16. The method of claim 13 wherein said interposer comprises an interface that is transparent to said initiator.

17. A method for supporting an expanded function of an execution unit of a system, said method comprising:
intercepting a call intended for support firmware of an execution unit of a system, wherein said call comprises a call to flush a cache of said execution unit;
determining whether said call is for an expanded function of said execution unit that is not supported by said support firmware; and
if said call is for said expanded function, using logic other than said support firmware to support said call for said expanded function.

18. A method for supporting an expanded function of an execution unit of a system, said method comprising:
intercepting a call intended for support firmware of an execution unit of a system;
determining whether said call is for an expanded function of said execution unit that is not supported by said support firmware;
if said call is for said expanded function, using logic other than said support firmware to support said call for said expanded function;
wherein said expanded function comprises an expansion to a function that is supported by said support firmware, but wherein said support firmware does not support said expansion; and
wherein said function that is supported by said support firmware comprises access to a first cache, and wherein said expanded function comprises access to an additional cache.

19. The method of claim 18 further comprising:
using a combination of both said support firmware and said logic other than said support firmware to support said call.

20. The method of claim 18 further comprising:
if said call is not for said expanded function of said execution unit, directing said call to said support firmware to support said call.

21. The method of claim 18 wherein said intercepting comprises:
intercepting said call from an initiator wherein said initiator is unaware of logic performing said intercepting.

22. The method of claim 21 wherein said initiator comprises an operating system.

23. The method of claim 18 wherein said execution unit comprises a processor.

24. A system comprising:
at least one execution unit;
first layer of supporting firmware for supporting said at least one execution unit;
second layer of supporting firmware for supporting an enhancement to said at least one execution unit, wherein said enhancement is not supported by said first layer of supporting firmware and wherein said second layer of supporting firmware comprises an interface that is transparent to said first layer of supporting firmware; and
wherein said enhancement to said at least one execution unit comprises an additional cache for said at least one execution unit.

25. The system of claim 24 wherein said at least one execution unit comprises an Intel Architecture (IA)-64 processor.

26. The system of claim 25 wherein said first layer of supporting firmware comprises Processor Abstraction Layer (PAL) firmware.

27. The system of claim 24 further comprising:
an initiator for accessing enhancement.

28. The system of claim 27 wherein said initiator comprises an operating system.

29. The system of claim 27 wherein said second layer of supporting firmware comprises an interface that is transparent to said initiator.

30. The system of claim 29 wherein said enhancement appears to said initiator to be supported by said first layer of supporting firmware.

31. The system of claim 27 wherein said second layer of supporting firmware is operable to intercept a call from said initiator intended for said first layer of supporting firmware.

32. The system of claim 24 wherein said supporting an enhancement comprises intercepting and returning information relating to said enhancement.

33. A system comprising:
at least one processor;
Processor Abstraction Layer (PAL) firmware for supporting a function of said at least one processor, wherein said function of said at least one processor comprises access to said at least one processor's cache;
logic expanding said function of said at least one processor in a fashion that is not natively supported by said PAL firmware; and
interposer firmware for supporting said expanded functionality.

34. The system of claim 33 wherein said at least one processor comprises an Intel Architecture (IA)-64 processor.

35. The system of claim 33 wherein said logic expanding said function comprises logic adding a cache for said at least one processor.

36. The system of claim 33 wherein supporting said expanded functionality comprises intercepting and returning information relating to said expanded functionality.

37. A system comprising:
at least one processor;
supporting firmware for supporting at least one function of said at least one processor, wherein said at least one function of said at least one processor comprises access to said at least one processor's cache;
logic operable to expand the functionality of said at least one function in a fashion that is not natively supported by said supporting firmware;
an operating system; and
an interposer intercepting and returning information relating to the expanded functionality, wherein said interposer comprises an interface that is transparent to said operating system.

38. The system of claim 37 wherein said interposer comprises an interface that is transparent to said supporting firmware.

* * * * *

UNITED STATES PATENT AND TRADEMARK OFFICE
CERTIFICATE OF CORRECTION

PATENT NO. : 7,146,488 B2
APPLICATION NO. : 10/414701
DATED : December 5, 2006
INVENTOR(S) : Bradley G. Culter et al.

It is certified that error appears in the above-identified patent and that said Letters Patent is hereby corrected as shown below:

On the Title page, in field (54), in column 1, in "Title", lines 1-2, delete "SYSTEM AND METHOD FOR EXPANDING PROCESSOR FUNCTIONALITY" and insert -- INTERPOSER FIRMWARE INTERCEPTING CALLS TO PROCESSOR ABSTRACTION LAYER (PAL) FOR EXPANDED CACHE FUNCTIONALITY --, therefor.

In column 1, in "Title", lines 1-2, delete "SYSTEM AND METHOD FOR EXPANDING PROCESSOR FUNCTIONALITY" and insert -- INTERPOSER FIRMWARE INTERCEPTING CALLS TO PROCESSOR ABSTRACTION LAYER (PAL) FOR EXPANDED CACHE FUNCTIONALITY --, therefor.

In column 9, line 62, delete "$PAL\_CACHE_{13}$ FLUSH" and insert -- PAL_CACHE_FLUSH --, therefor.

In column 12, line 48, delete "chache" and insert -- cache --, therefor.

Signed and Sealed this

Twenty-third Day of December, 2008

JON W. DUDAS
*Director of the United States Patent and Trademark Office*